United States Patent [19]

Thay

[11] Patent Number: 4,824,131
[45] Date of Patent: Apr. 25, 1989

[54] COLLAPSIBLE FOLDING BICYCLE ASSEMBLY

[76] Inventor: Ching H. Thay, 446, Chien Kuo 1st Rd., San Min District, Kaoshiung, Taiwan

[21] Appl. No.: 154,076
[22] Filed: Feb. 9, 1988
[51] Int. Cl.⁴ .............................................. B62D 15/00
[52] U.S. Cl. .................................. 280/278; 74/551.3; 74/594.7
[58] Field of Search ............... 280/278, 287; 74/594.7, 74/551.3, 551.4, 551.5, 551.6, 551.7; 403/101, 100

[56] References Cited

U.S. PATENT DOCUMENTS

| | | | |
|---|---|---|---|
| 607,325 | 7/1898 | Barnes | 280/287 |
| 1,087,258 | 2/1914 | Reynolds et al. | 74/594.7 |
| 3,979,136 | 9/1976 | Lassiere | 280/278 |
| 4,202,561 | 5/1980 | Yonkers | 280/278 |
| 4,460,192 | 7/1984 | Takamiya et al. | 280/278 X |

FOREIGN PATENT DOCUMENTS

| | | | |
|---|---|---|---|
| 918855 | 8/1954 | Fed. Rep. of Germany | 74/551.3 |
| 928709 | 12/1947 | France | 280/287 |

*Primary Examiner*—John A. Pekar
*Attorney, Agent, or Firm*—Asian Pacific International Patent and Trademark Office

[57] ABSTRACT

A new design of collapsible/folding bicycle construction which mainframe, handlebars, footpedals are all collapsible. Another main feature is that the connections of the mainframe, handlebars, seat stem, seat reinforcement rods are all adjustable, thus allowing minimal space consumption and enable easy transportion handling and storage.

6 Claims, 5 Drawing Sheets

COLLAPSIBLE FOLDING BICYCLE ASSEMBLY

BACKGROUND OF THE INVENTION

Bicycle are one of the oldest and most economical means of transportion. The appearance of the bicycle may change from time to time, but there has been no revolutionary breakthrough in its basic structure. There must be a main frame, pedals, two wheels, etc. for a bicycle to function. Human energy (peddling) must be used to rotate the two wheels. Therefore, bicycles are also frequently used as an outdoor sports activity.

Although traditional bicycles are rather light-weight, owing to their bulkiness, they cannot be easily stored and transported. When they are carried, exported, and transported for a long distance, freight charges often represent a very high percentage of the relocation costs. The present invention overcomes some of these disadvantages. The invention contemplates a collapsible/folding bicycle that minimizes storage space, and enables transportation and handling to be easier and simpler

SUMMARY OF THE INVENTION

The invention is a new design for a folding bicycle. To allow folding, some parts are hinged together. The main frame of the bicycle has several hinges at different folding points. The main frame has pivot connections with handlebars, stem of the seat, and reinforcement rods, to permit the bicycle to be easily and quickly folded into a compact package. The handlebars of the bicycle are made from special C-shaped pipes that make folding relatively easy. Special fold-up foot pedals are used on the bicycle.

BRIEF DESCRIPTION OF ATTACHED DRAWINGS

FIG. 1. is an exploded view of a bicycle embodying the invention.

FIG. 1-1 is a side elevational view of the FIG. 1. bicycle.

FIG. 2. 2-1 and 2-2 are fragmentary views of handlebar components used in the FIG. 1 bicycle.

FIG. 3. is a side elevational view of the FIG. 1. bicycle after folding.

FIG. 4. is a front perspective view of a foot pedal used in the

FIG. 1 bicycle.

FIG. 4-1 is a rear perspective view of the foot pedal in a folded condition.

DETAILED DESCRIPTION OF A PREFERRED EMBODIMENT OF THE INVENTION

Figure 1:
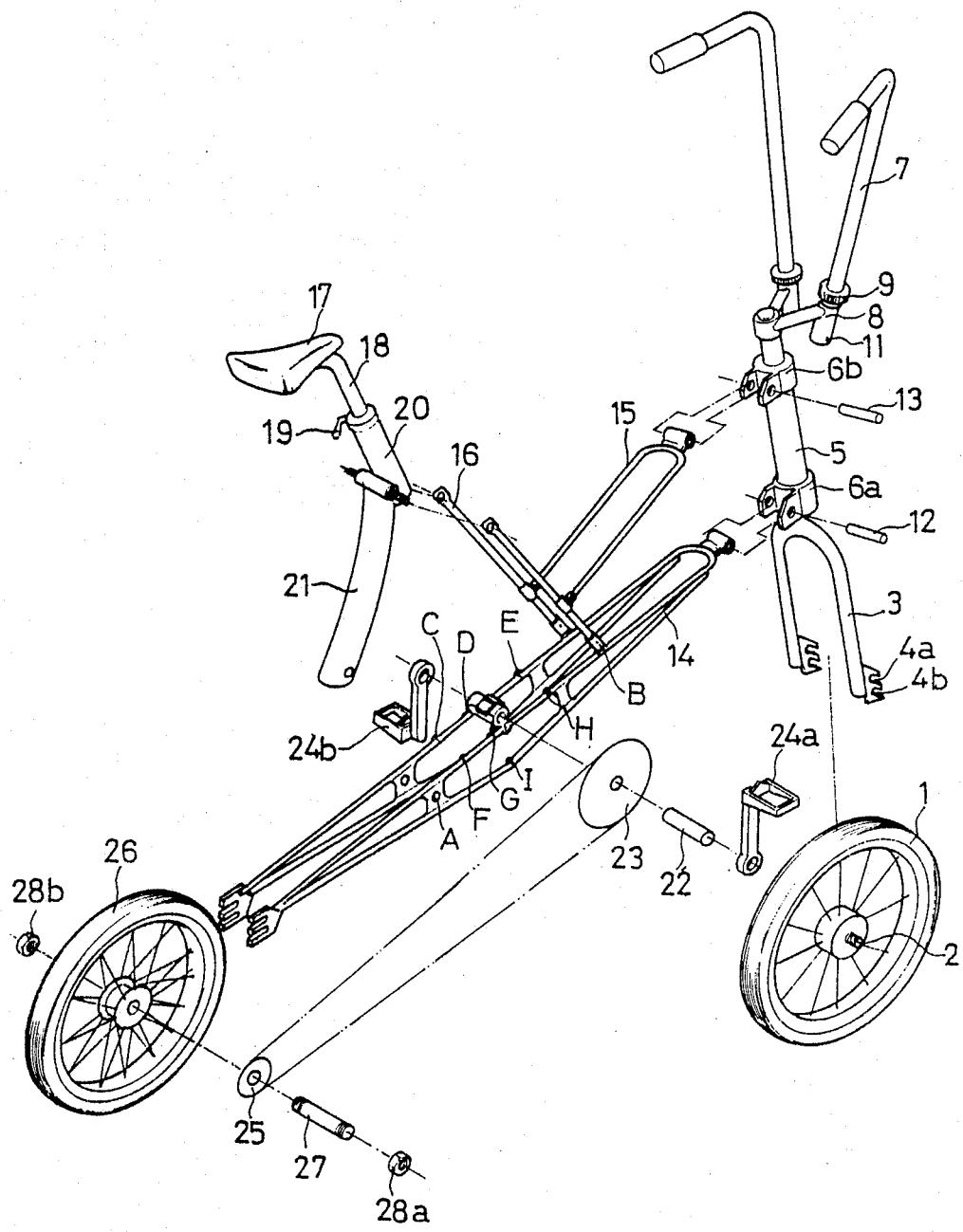
Figure 1:
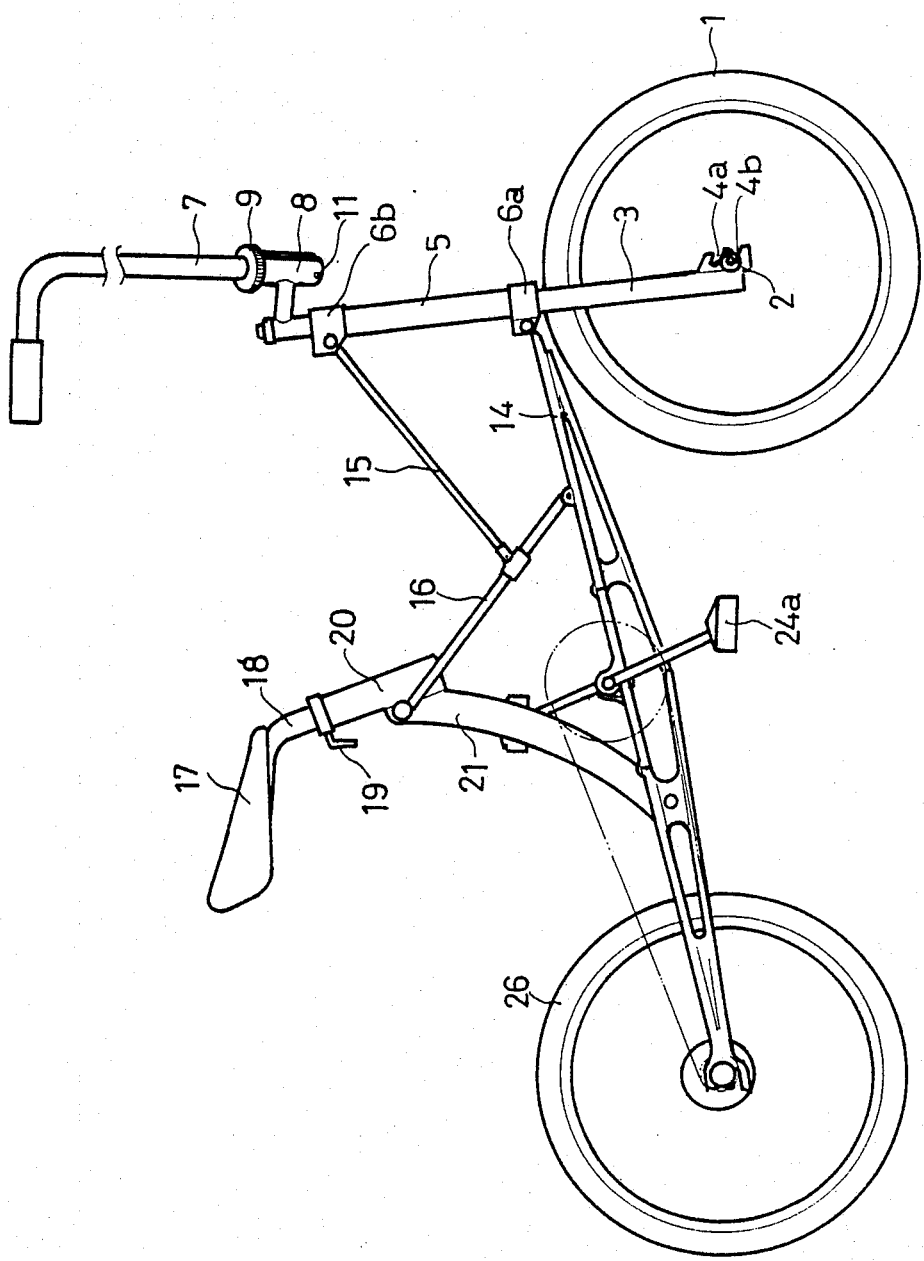
Figure 2:
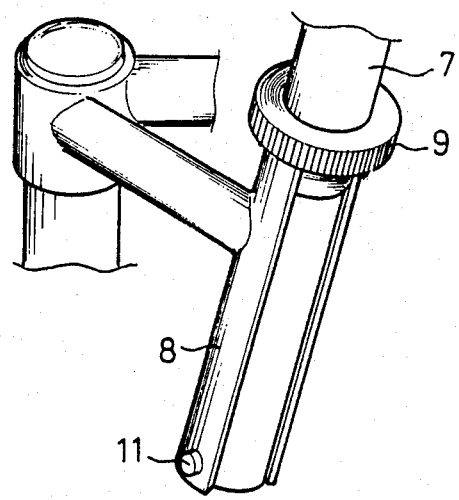
Figures 1, 2:
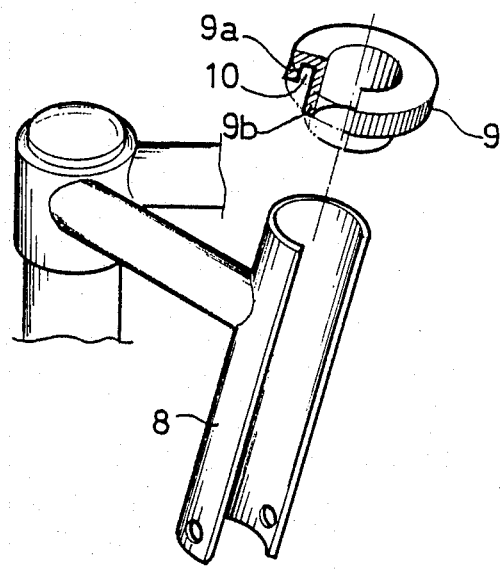
Figure 2:
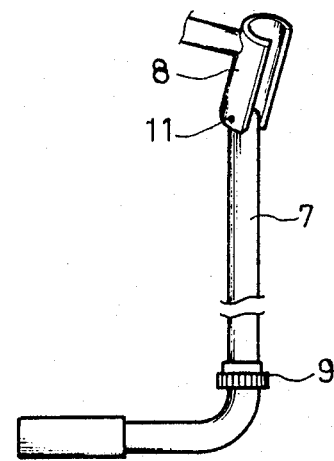

FIG. 1. shows a bicycle assembly that includes an elongated frame mechanism 14, front fork 3, front wheel 2, rear wheel 26, and seat 17. Front wheel axle 2 is used for mounting the front wheel onto the front fork 3, at slots 4A or slots 4B, depending on the outside diameter of the front wheel. An upper post portion of front fork 3 extends through a goose neck tube 5 for connection to the handlebars 7. These are collapsible folding handlebars (refer to FIG. 2 for structural details). Each handlebar 7 is inserted into a C-shaped clevis 8 and unlocked into position by a locking ring 9 (refer to FIG. 2-1) Between the outer diameter 9A and inner diameter 9B of each locking ring, there is a machined groove 10. When assembling the locking ring to C-shaped clevis 8, the clevis 8 fits into this U-shaped groove 10. When folding the handlebars (Refer to FIG. 2), each locking ring 9 is lifted to enable the handlebar 7 to come out of C-shaped clevis 8 and fold downwards, using connecting pin 11 as a swivelling point, as in FIG. 2-2.

Referring again to FIG. 1, on the top and bottom ends of the goose neck tube 5 there are two clamps, i.e. a top clamp 6B and a bottom clamp 6A. The bottom clamp 6A has a locking pin 12 that pivotably connects the goose neck tube 5 to the main frame mechanism 14. The upper clamp 6B has an identical pin 13 that pivotably connects to the supporting arms 15. The other ends of these supporting arms 15 are pivotably joined to two seat reinforcement rods 16. The seat 17 has a slanted seat stem 18 that is inserted into a pipe 20, thus enabling adjustment of the seat to a desired height. The seat is locked into position by the adjusting knob 19. The whole seat assembly is supported by the main seat support bar 21 and the two seat reinforcement rods 16. Bar 21 and rods 16 are pivotably connected to frame mechanism 14 at points A and B. At the approximate mid point of the main frame 14 is a sleeve that supports a rotary sprocket shaft 22. The sprocket 23 and footpedal assemblies 24A and 24B are all mounted onto this shaft. Parallel to the front sprocket 23 is a rear sprocket 25 which is assembled to the rear wheel 26 and locked onto the rear end of frame mechanism 14 by the rear wheel axle 27 and two lock-nuts 28A and 28B.

The design of main frame mechanism 14 is quite different from conventional bicycles. The connections of the goose neck bottom clamp 6A, top clamp 6B, seat supporting stem 18, pipe 20 and seat reinforcement rods 16 are all adjustable and not locked or welded to enable easy folding. The mid-section of frame mechanism 14 includes two hingely-connected struts that have pivot connections C,F, E and H with longitudinally spaced portions of the frame mechanism. A hinge joint I is provided in a lower section of frame mechanism 14 just below the hingedly-connected struts.

Frame mechanism 14 comprises two laterally-spaced skeleton wall structures. Each skeleton wall structure has a significant vertical thickness in the mid area of the fram mechanism, i.e. the area used to support sprocket shaft 22, sprocket 23 and pedal assemblies, 24a and 24b. Each skeleton wall structure has a gradually tapering vertical wall thickness from its mid area toward either end of the frame mechanism.

Rear end sections of the skeleton wall structures extend along side surfaces of the rear ground wheel. A transverse tube is attached to front areas of the skeleton wall structures for pivotally connecting the frame mechanism to clamp 6a and the associated gooseneck tube 5.

Figure 3:
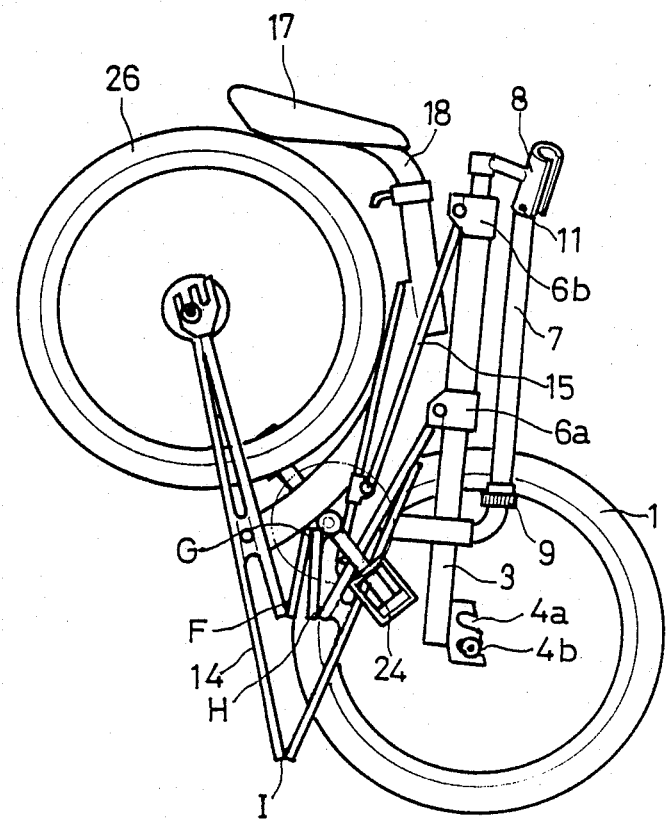

FIG. 3. shows the frame mechanism 14 in its folded condition. Before attempting to fold the mechanism it is first necessary to disconnect (or remove) the detachable pivot connection between reinforcement rods 16 and seat assembly pipe 20; the remaining pivot connections remain in place. Frame mechanism 14 is folded so that the hingedly-connected struts buckle upwardly around pivot connections F and H to the condition shown in FIG. 3. The front end of frame mechanism 14 is brought relatively close to the rear end of the frame mechanism as shown in FIG. 3.

Figures 1, 4:
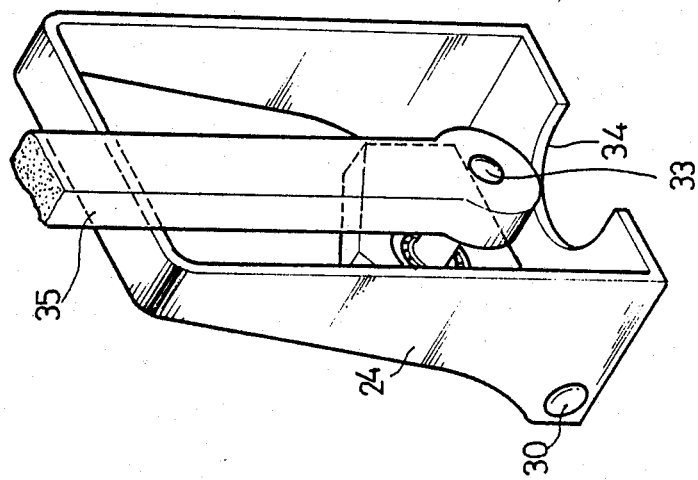
Figure 4:
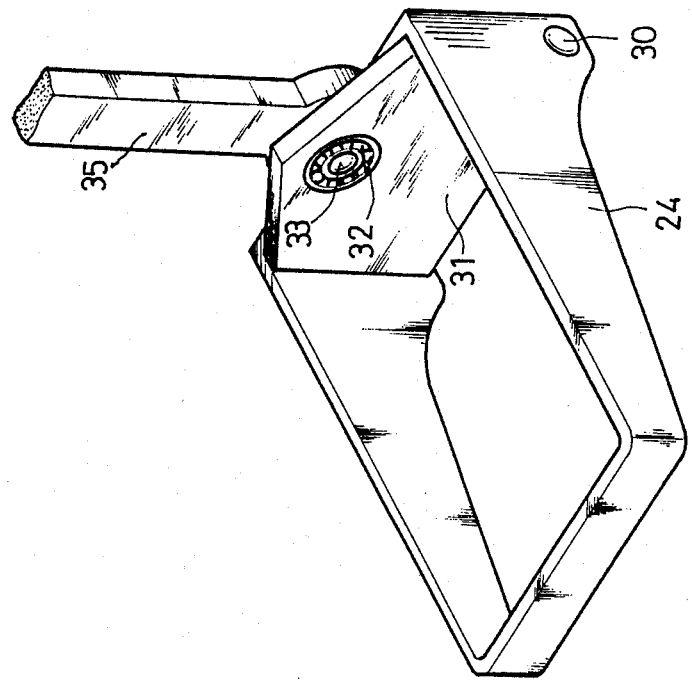

FIG. 4 and 4-1 show construction details of each foot pedal 24. The foot pedal 24 is pivotably locked by a bolt 30 onto a vertical backing plate 31. This backing plate is connected to a crank 35 by an anti-friction bearing 32 and a bolt (shaft) 33. The backing plate 31 is allowed to rotate due to this bearing 32. Bolt 30 forms a transverse swing axis that enables the foot pedal 24 to fold upwards as shown in FIG. 4-1. Since the bolt 33 is connected to the backing plate 31 by a bearing 32, it allows more efficient operation of the footpedals 24.

The footpedal 24 uses the backing plate 31 as a pendulum type support; the backing plate 31 relies on the connecting bolt 33 as a support point. Because this support point (position of bolt 33) is located at the upper end of backing plate 31 the backing plate has a relatively low center of gravity. The pedal can always maintain a horizontal position, as in FIG. 4, and cannot flip over due to imbalance.

FIG. 1-1 shows the bicycle in its operating (unfolded) condition. Rods 16, bar 21 and the mid-section of frame mechanism 14 form a rigid triangular framework that provides a strong mount structure for seat 17, sprocket 23, and the two ground wheels 1 and 26.

I claim:

1. A folding bicycle comprising an elongated frame mechanism (14) extending in a front-to-rear direction at a slight downward angle;

a front steering assembly comprising a front tube (5) having a pivotal connection (12) with the front end of said frame-mechanism, a post extending downwardly through said front tube, a wheel fork (3) attached to the lower end of said post, and two fold-down handle bars(7) swingably connected to the upper end of said post;

a front ground wheel rotatably supported in said wheel fork, and a rear ground wheel rotatably supported at the rear end of the elongated frame mechanism;

a seat assembly located substantially above the mid point of the frame mechanism, said seat assembly comprising a substantially vertical pipe (20) and a seat-support stem (18) extending within said pipe;

an elongated reinforcement rod means (16) having one end thereof pivotably connected to the elongated frame mechanism (14) at a point near the frame mechanism front end, said reinforcement rod means extending upwardly and rearwardly, with its other end pivotably and detachably connected to said seat assembly pipe;

an elongated arm means (15) having one end thereof pivotably connected to said front tube, said arm means extending rearwardly and downwardly, with its other end pivotably connected to said reinforcement rod means;

an elongated support bar (21) having one end thereof affixed to said seat assembly pipe, said bar extending downwardly and rearwardly with the other end pivotably connected to the elongated frame mechanism at a point spaced rearwardly from the midpoint of the frame mechanism;

said elongated frame mechanism comprising a sprocket shaft support means located in an upper edge area of the frame mechanism at a point substantially directly below the seat assembly pipe: said shaft support means comprising two hingely connected strut mechsnisms having pivot connections (at F and H) with longitudinally spaced portions of the frame mechanism; said frame mechanism including a hinge joint (at I) below said strut mechanisms;

whereby, when the reinforcement rod means is detached from the seat assembly pipe the elongated frame mechanism can be folded at the aforementioned pivot connections and hinge joint so that the front end of the frame mechanism is brought relatively close to the rear end of the frame mechanism.

2. The folding bicycle of claim 1 wherein said elongated frame mechanism comprises two laterally-spaced skeleton wall structures, wach skeleton wall structure having a significant vertical thickness in the mid area of the frame mechanism, and a gradually tapering vertical wall thickness from the mid area toward either end of the frame mechanism.

3. The folding bicycle of claim 2 wherein rear sections of the skeleton wall structures extend along side surfaces of the rear ground wheel; said frame mechanism comprising a transverse tube at the front ends of the skeleton wall structures for pivotally connecting the frame mechanism to said front tube.

4. The folding bicycle of claim 1 and further comprising a sprocket shaft extending transversely across the frame mechanism, a crank attached to each end of the sprocket shaft, and a fold-up pedal mechanism carried on each crank; each pedal mechanism comprising a shaft (33) extending outwardly from the associated crank, a vertical backing plate (31) rotatably suspended at its upper end from the crank shaft, and a pedal member (24) swingably connected to the lower end of the bracking plate for swinging motion around an axis transverse to the axis of the crank shaft.

5. The folding bicycle of claim 4 wherein the bracking plate is located within the pedal member whereby the bracking plate limits swinging motion of the pedal member to its operating position.

6. A foldable bicycle comprising a collapsible upright triangular frame that includes an elongated frame member (14) having its front end connected to a gooseneck tube (5) and its rear end connected to a rear ground wheel (26); a sprocket shaft (22) extending across the elongated frame member substantially at the mid point of the frame member; a crank (35) extending right-angularly from each end of the sprocket shaft; and a fold-up pedal mechanism carried on each crank; each pedal mechanism comprising a shaft (33) extending outwardly from the associated crank, a vertical backing plate (31) rotatably suspended at its upper end from the crank shaft, and a pedal member (24) swingably connected to the lower end of the backing plate for swinging motion around an axis transverse to the axis of the crank shaft.

* * * * *